United States Patent
Smith et al.

(10) Patent No.: US 7,328,475 B2
(45) Date of Patent: Feb. 12, 2008

(54) CENTRE LINE MULTIDIMENSIONAL SUSPENSION SYSTEM

(75) Inventors: Steve Smith, Leeds (GB); Simon Sykes, Wakefield (GB)

(73) Assignee: FLT Seals Technology Limited, Leeds (GB)

( * ) Notice: Subject to any disclaimer, the term of this patent is extended or adjusted under 35 U.S.C. 154(b) by 0 days.

(21) Appl. No.: 11/438,571

(22) Filed: May 22, 2006

(65) Prior Publication Data

US 2007/0174983 A1 Aug. 2, 2007

Related U.S. Application Data

(63) Continuation of application No. 09/937,413, filed as application No. PCT/GB00/01159 on Mar. 28, 2000, now abandoned.

(30) Foreign Application Priority Data

Mar. 29, 1999 (GB) ................................. 9907145.8
Jan. 21, 2000 (GB) ................................. 0001351.6

(51) Int. Cl.
*B08B 9/055* (2006.01)
(52) U.S. Cl. .............................. 15/104.061; 15/104.05; 134/8
(58) Field of Classification Search ............. 15/104.05, 15/104.09, 104.16, 104.061; 134/8
See application file for complete search history.

(56) References Cited

U.S. PATENT DOCUMENTS

| | | | |
|---|---|---|---|
| 2,887,118 A | 5/1959 | Loeffler et al. | |
| 3,058,137 A | * 10/1962 | Doyle et al. | ........... 15/104.061 |
| 3,755,908 A | 9/1973 | VerNooy | |
| 3,885,521 A | * 5/1975 | von Arx | ...................... 118/105 |
| 4,462,430 A | * 7/1984 | Anthony et al. | .............. 138/89 |
| 4,938,167 A | 7/1990 | Mizuho et al. | |

FOREIGN PATENT DOCUMENTS

| | | |
|---|---|---|
| CN | 676092 | 12/1990 |
| EP | 0 378 480 | 7/1990 |
| GB | 2 301 162 | 11/1996 |
| WO | 97/14910 | 4/1997 |
| WO | 00/58660 | 10/2000 |

OTHER PUBLICATIONS

International Preliminary Examination Report for SPG/P36077/WO.

* cited by examiner

*Primary Examiner*—Randall Chin
(74) *Attorney, Agent, or Firm*—Myers Bigel Sibley & Sajovec

(57) ABSTRACT

There is described a novel apparatus for use in connection with pipe cleaning and monitoring systems. The apparatus is a suspension system adapted to fit a pipeline pig shaft, the pig being provided with a plurality of wheels. The wheels are concentrically mounted around a biasing means which is operable in a direction coplanar with the pig shaft. There is also described a pipeline pig comprising the suspension system and a method of cleaning a pipeline.

17 Claims, 11 Drawing Sheets

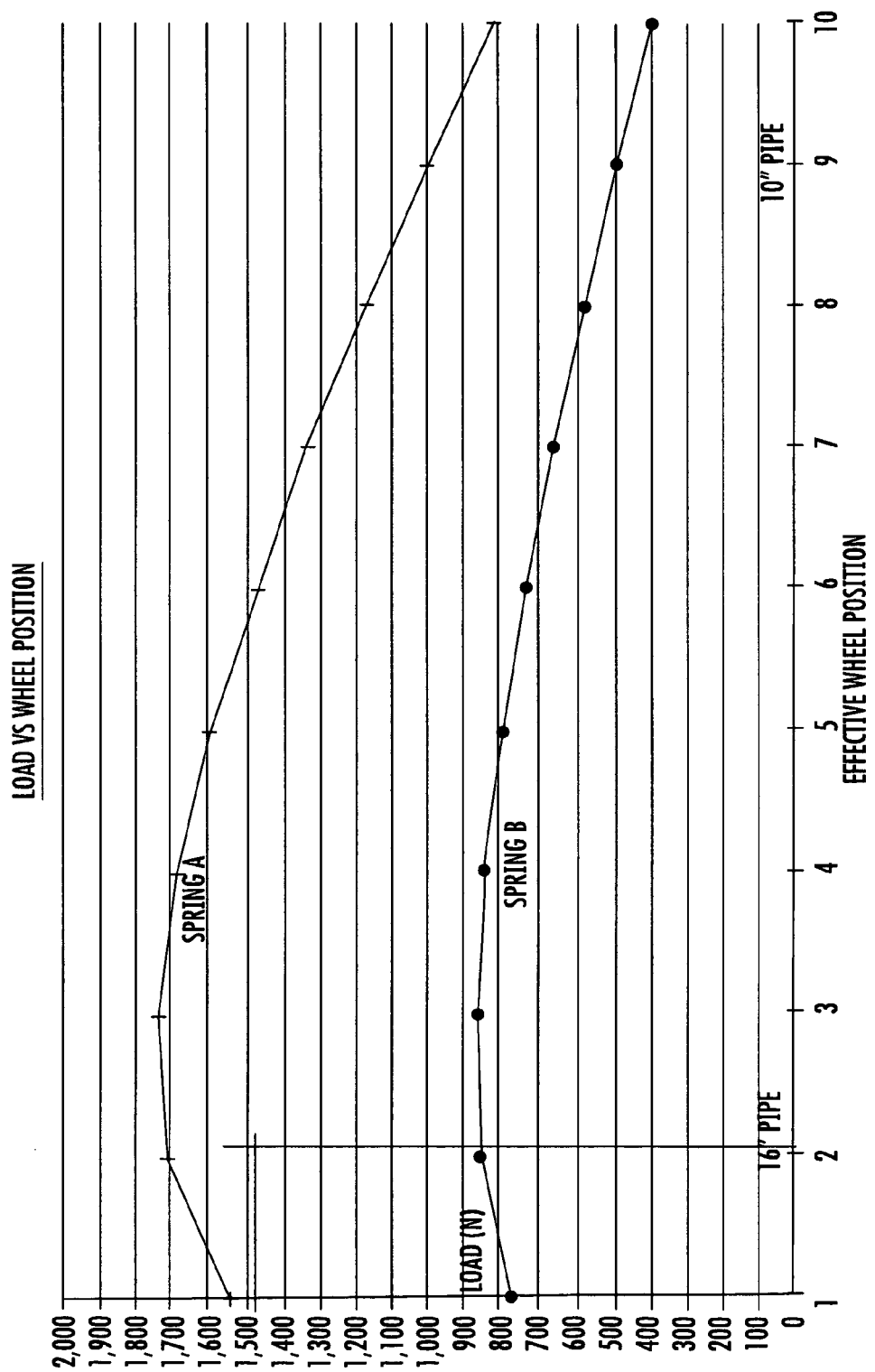

CENTRE LINE MULTIDIMENSIONAL SUSPENSION SYSTEM

CROSS-REFERENCE TO RELATED APPLICATIONS

The present application is a continuation of U.S. patent application Ser. No. 09/937,413, filed Mar. 20, 2002, now abandoned, which is a U.S. national phase application of PCT International Application No. PCT/GB00/01159, having an international filing date of Mar. 28, 2000 and claiming priority to Great Britain Application Nos. 9907145.8 and 0001351.6 filed Mar. 29, 1999 and Jan. 21, 2000. The above PCT International Application was published in the English language and has International Publication No. WO 00/58660.

BACKGROUND OF THE INVENTION

This invention relates to a novel apparatus for use in connection with pipe cleansing and monitoring systems.

SUMMARY OF THE INVENTION

In particular the invention relates to a novel suspension system for use in relation to pipeline pigging apparatus, for pipes ranging in diameter from as small as 6 inches (15.24 cm) to as large as 56 inches (142.24 cm), although the system could fit into pipes of any diameter. The invention also relates to a pig comprising the suspension system and to a method of cleaning or monitoring a pipeline.

Both subsea and land pipelines for the transportation of various products are subjected to frequent internal cleaning and inspection. This process, known as "pigging", is effected by inserting a "pig" into the pipeline. The "pig" usually comprises a longitudinal shaft upon which is mounted at least one sealing disc and at least one guide disc, more normally a pair, comprising a sealing disc and a guide disc, is situated at each end of the shaft.

In a dewatering, RFO (ready for operations) or cleaning pig, the diameter of the sealing disc is such that it creates a positive interference between the inner walls of the pipe and the outer surface of the sealing disc. Motion is induced in the pig vehicle due to the flow of the product, e.g. oil or gas, in the pipeline against the sealing disc. Thus, the pig progresses along the pipeline, the sealing disc scraping the sides of the pipe wall causing a sealing, cleaning and scouring motion. Such pipeline pigs are used in commissioning and decommissioning fuel pipelines and cleaning pipelines in use, e.g. production pipelines.

Pipeline cleaning technology up to this point has relied upon a pig unit consisting of discs connected by spacer rings via their longitudinal axis. The weight of the pig is supported on "hard" guide discs or, alternatively, individually sprung wheels, whilst the cleaning is carried out by "soft" sealing discs.

Inspection pigs operate along similar lines, but because there is no necessity to scrape the internal walls of the pipe, other than to effect propulsion inspection pigs can be mounted on individually sprung wheels. They usually comprise a longitudinal shaft provided with one or more guide discs and are propelled in a similar fashion to a cleaning pig. An inspection pig will also be provided with monitoring equipment, for example, gauging discs, odometer wheels, or n.d.t. (non destructive testing) measuring equipment to enable the detection of structural flaws in the pipes. Such monitoring equipment is well known to those skilled in the art.

However, both types of pig currently used suffer from the disadvantage that they cannot be run concentrically down a pipeline. For cleaning pigs this can result in uneven wear of the guide and/or sealing discs. Even with a wheeled pig, because, inter alia, the wheels are independently sprung, the weight of the pig will usually rest on a fraction of the wheels at any given time, for example, when the pig is travelling through a horizontal pipe, the lowest set of wheels will take most of the load. This will cause the pig to run off centre and cause uneven wear on the discs.

To compensate for this "below centre line" running, up until now sealing discs have been manufactured with a considerable oversize on the outer diameter. This allows for off centre line running and wear and tear on the disc, but creates considerable friction between the sealing disc and pipe wall and results in a differential pressure that builds up across the sealing disc. This pressure differential is used effectively to 'drive' the pig, but when the friction is too great the differential pressure becomes unrealistically high. In fact, it can become so high that a phenomenon known as 'plugging' could occur.

Thus, there has long been a desire to produce a pig which reduces wear and friction thereby increasing efficiency and increasing the pig's life span. A reduction in friction between sealing discs and pipe wall would result in a lower differential pressure, across the sealing disc, by which method the pig is propelled along the pipe.

Moreover, there has been an increasing desire to manufacture a pig which is capable of being used in pipelines of varying diameters, such as, for example, that which is being laid as part of the large Åsgard transport line in the Norwegian Sea.

We have now surprisingly found a novel suspension unit which is suitable for use with a pig assembly and which overcomes or mitigates the aforementioned disadvantages. The suspension unit also permits the manufacture of a pig which is capable of functioning in multidiameter pipelines. Previously, it has only been possible to manufacture a pig which can adjust between say 40 and 42 inches (101.6 cm and 106.68 cm), whereas the novel suspension systems permit variation between, for example, 28 and 42 inches (71.12 cm and 106.68 cm), as well as 10 and 16 inches (25.4 cm and 40.64 cm) and other combinations of dual diameter pipeline that are commonly found in subsea and land applications.

Thus, according to the invention we provide a pig suspension system adapted to fit a pig shaft and comprising a plurality of wheels characterised in that the wheels are concentrically mounted around a biasing means which is operable in a direction coplanar with the pig shaft.

The biasing means is preferentially a piston. The piston used in the suspension unit of the invention may comprise any conventionally known type of piston, such as a hydraulic piston. However, a preferred piston is a spring loaded piston.

The wheel and piston arrangement will preferably comprise a plurality of wheels wherein each wheel is supported by a radially mounted suspension arm which itself is connected to a piston mounting block by a pivot pin. The suspension arm is pivotally connected to a tie rod. The end of the tie rod distal to the suspension arm being connected via a pivot pin to the piston. The piston assembly is such that the piston operates in a direction coplanar with the pig shaft. Thus in operation the piston will generally be acting in, for example, a horizontal plane and the tie rod will convert the piston movement to radial movement of the suspension arm and consequently the wheel.

The piston may be internally or externally mounted.

Thus, according to the invention we provide a pig suspension system adapted to fit a pig shaft and comprising a pig body provided with a plurality of wheels characterised in that the wheels are concentrically mounted around a biasing means which is operable in a direction coplanar with the pig shaft and each wheel being connected to a suspension arm, each suspension arm being operably linked to an externally mounted biasing means.

As previously mentioned, one significant advantage of the suspension unit of the invention is that it provides centre line running of the pig. Centre line running is achieved because there is effectively a constant loading on each individual wheel, of which the sum total load from all wheels is greater than the weight of the pig, thereby centralising it in the pipe. With a conventionally sprung wheel, the loading can increase significantly if the diameter of the pipe reduces and will usually lead to failure of the wheel bearings, roller covering, etc. However, with our novel suspension unit comprising a spring loaded piston, in conjunction with suspension arm geometry, the spring compresses giving an increase in force, but controlled load of the wheel. Thus it is a particular aspect of this invention which provides a pig suspension unit which has substantially constant wheel loading. In an especially preferred embodiment we provide a suspension unit in which the wheel loading can be kept between the limits of 400N and 13,000 N. Thus, for example, the wheel loading in a 28 inch (71.12 cm) diameter pipe will be between 4,000 and 7,000 N; for a 42 inch (106.68 cm) diameter pipe the wheel loading will be between 6,000 and 10,000 N.

For a 10 inch (25.4 cm) diameter pipe the wheel loading will be 400N to 1,500N: for a 16 inch (40.64 cm) diameter pipe the wheel loading will be 500N to 2000N.

The wheel loading can be varied depending upon, inter alia, the nature and tuning of the suspension system. Thus, in the case of a spring loaded piston, the spring rate may be varied depending on each application. If the weight of the pig changes, through, for example adding parts, then the springs can be tuned which will modify the spring rate. Thus, by way of example only, the spring rate may be between 10 and 70 N/mm, preferably between 20 and 60 N/mm. Furthermore, the wheel loading can be altered if the spring is adjusted. The spring pre-loading is a spring rate of 50 N/mm and 27.5 mm pre-loading and may be between 20 and 50 mm in the case of the 28 to 42 inch (71.12 cm to 106.68 cm) system. A preferred arrangement will be variable depending upon application.

The suspension can be tuned by adjusting the position of the tie rod pivot point on the suspension arm. Thus the pivot point may be varied depending upon, inter alia, the pig weight and the performance required of the pig and which would be understood by one skilled in the art. The geometry of the tie rod connection to the suspension arm will also vary depending upon the application, although it is related to the spring rate. For example, there will be a maximum continuous wheel loading for a chosen wheel and the geometry will be "balanced" by adjustment of the spring rate.

In a further preferred embodiment, the suspension arms of the wheel assembly is offset from the axis of the pig shaft. This enables the wheel assembly, and hence the pig, to rotate whilst travelling down a pipe. This has the advantage that there is an evening out of the length of time any wheel experiences maximum load and, more importantly, it minimises and evens out the wear on the sealing discs. The degree of offset may be varied depending upon the application of the pig, but, for example, the suspension unit may be offset between 1 and 3° of the pig shaft axis and preferably 2° of the pig shaft axis.

The number of wheels provided in a suspension unit of the invention may vary depending upon the size and weight of the pig. In a preferred embodiment a pig will be provided with at least two wheel assemblies comprising the suspension unit of the invention, e.g. a front and a rear set. Although, for articulated pigs more than two sets may be used. Although each set may comprise any number of wheels, preferably supported by up to eight wheels may be used in any set, although this number may be varied according to the dimensions of the pig. All the wheels in a single assembly are preferably connected to an appropriate piston although it is within the scope of the invention that some of the wheels may be conventionally mounted. The wheels are generally arranged so that any wheel is mounted with another wheel on the opposing side of the shaft. Alternatively, if an odd number of wheels is used then the wheels may be arranged asymmetrically.

However, in a preferred embodiment a pig is provided with two sets of wheels, substantially one at either end of a pig shaft. We have found it particularly advantageous when operating a pig with at least two wheel assemblies to have the wheels of one assembly offset from the plane in which the wheels of a second assembly operate. By the term wheel it is intended to encompass conventionally known wheels, rollers, spheres, etc. and other known alternatives.

The tie rod used in the suspension system of the invention may incorporate a turnbuckle. The turnbuckles may be provided separately to the suspension. However, as an aspect of the invention we provide a turnbuckle for use in connection with a tie rod and a suspension system as herein before described.

According to a further feature of the invention we provide a pipeline pig comprising a suspension unit as hereinbefore described.

The novel wheeled pig is advantageous in that, inter alia, in all spheres of operation it retains the centre line, unlike conventionally known pigs. Thus, as a consequence, it reduces and evens out the wear on the discs and increases efficiency. Thus, in one aspect of the invention, conventionally used discs may be included in the pig system. Such discs usually comprise substantially circular polyurethane discs, "hard" discs being used to support the pig and "soft" discs to scrape the inner surface of the pipe. However, for use in relation to dual diameter pipes, a collapsible disc may advantageously be used, such that the disc may, for example, fold or unfold to reflect the dimensions of the pipe.

The efficiency of a dewatering pig may be measured in a variety of ways. A dewatering pig may be used in conjunction with a hygroscopic material, such as a glycol, e.g. ethylene glycol, the glycol often being entrapped as a "plug" between the discs. Thus one way of measuring the efficiency of a dewatering pig is to measure the water uptake of the glycol. Generally, the lower the efficiency, e.g. due to wear on the discs and eccentricity, the greater the water uptake of the glycol. Conventionally, a dewatering pig comprises a train of, e.g. six, pigs together. Normally, glycol is entrapped between pigs 1 and 2 (glycol 1); 2 and 3 (glycol 2); and 3 and 4 (glycol 3); glycol 1 taking up the most water. A typical example of the water content of the glycol following a dewatering run is;

glycol 1: 30% w/w water glycol 2: 5% w/w water glycol 3: 1% w/w water

The determination of water content may be carried out using conventional techniques known per se, e.g. Karl Fischer titration.

However, by the use of the suspension system of the present invention the efficiency may be improved. Thus, for a train of six pigs using the suspension system of the invention, the glycol is found to have a water content of;

glycol 1: 5% w/w water
glycol 2: 2% w/w water
glycol 3: 0.5% w/w water

We especially provide a pipeline pig with a dewatering efficiency of between 0.1 and 1.0% w/w water in glycol, preferably 0.2 to 0.8% w/w and more preferably 0.4 to 0.6% w/w, eg 0.5% w/w.

It is an especially advantageous feature of the present invention that a pipeline pig using a centre line suspension system can operate at a minimal differential pressure and high efficiency.

Thus according to a further feature of the invention we provide a pipeline pig as hereinbefore described which has a dewatering efficiency of 0.5% w/w or less water in glycol and a differential pressure of 0.5 bar or less.

The differential pressure is preferably between 0.2 and 0.5 bar, more preferably between 0.2 and 0.4 bar, e.g. 0.3 bar.

It is well understood in the art that if a pipeline pig should stall inside a pipeline that increased pressure may be applied in the direction of flow in order to restart movement of the pig.

The pressure applied can be high and it is essential that the sealing disc of the pig be designed so that the increased pressure will not cause it to "flip" forward and create bypass of the driving medium, resulting in complete loss of driving force.

The pressure at which the sealing disc commences to flip is known as the "flip pressure". The flip pressure, for those versed in the art, is normally stated to be a multiple of the differential pressure. For example a flip pressure of 10 times is common.

It is a feature of this invention that when comparing it to conventional high interference/high differential pressure pig designs, a much higher multiple of flip pressure to differential pressure can be achieved.

This results in the benefit of either the sealing disc being able to withstand a higher flip ratio multiple (thereby reducing the likelihood of flipping and stalling) and/or the ability for the drive disc to be of lighter construction as the quoted example of the times 10 multiplier will result in a lower absolute flip pressure value which, in a multi-diameter pipeline application, will give it the ability to fold more easily when entering the lesser diameter.

Thus according to a yet further feature of the invention we provide a pipeline pig as hereinbefore described which has a flip pressure of 5 bar or less.

The flip pressure is preferably between 2 and 5 bar, more preferably between 2 and 4 bar, e.g. 3 bar.

In a further embodiment of the invention two or more pigs may be coupled together. Such a coupled pig is advantageous in that, inter alia, it aids in progression of the pig over any voids in the pipeline. The pigs may be coupled in any conventional manner, e.g. by a ball joint and shaft, enabling one pig to be rotatable relative to the other.

According to a further feature of the invention we provide a method of cleaning a pipeline which comprises passing a pig as hereinbefore described down the pipeline, at least once.

According to the invention we also provide a method of detecting a defect in a pipeline which comprises a measuring pig as hereinbefore described down the pipeline, at least once.

Optionally a pig of the invention may be adapted so as to act as a cleaning pig and a measuring pig simultaneously.

In a further alternative embodiment, the pig of the invention may be provided with conventional detector systems, for example gauging discs, odometer wheels, thus enabling the pig to be used as a detector pig and enabling the manufacture of semi-intelligent cleaning pigs.

BRIEF DESCRIPTION OF THE DRAWING

The invention will now be illustrated by way of two examples only and with reference to the accompanying drawings, but in which the principal of the invention would remain the same for all pipe diameters.

FIG. 11 is a graph of wheel load versus suspension arm deflection, for a 10 to 16 inch (25.4 cm to 40.64 cm) suspension system.

DETAILED DESCRIPTION OF EMBODIMENTS OF THE PRESENT INVENTION

Figure 1:
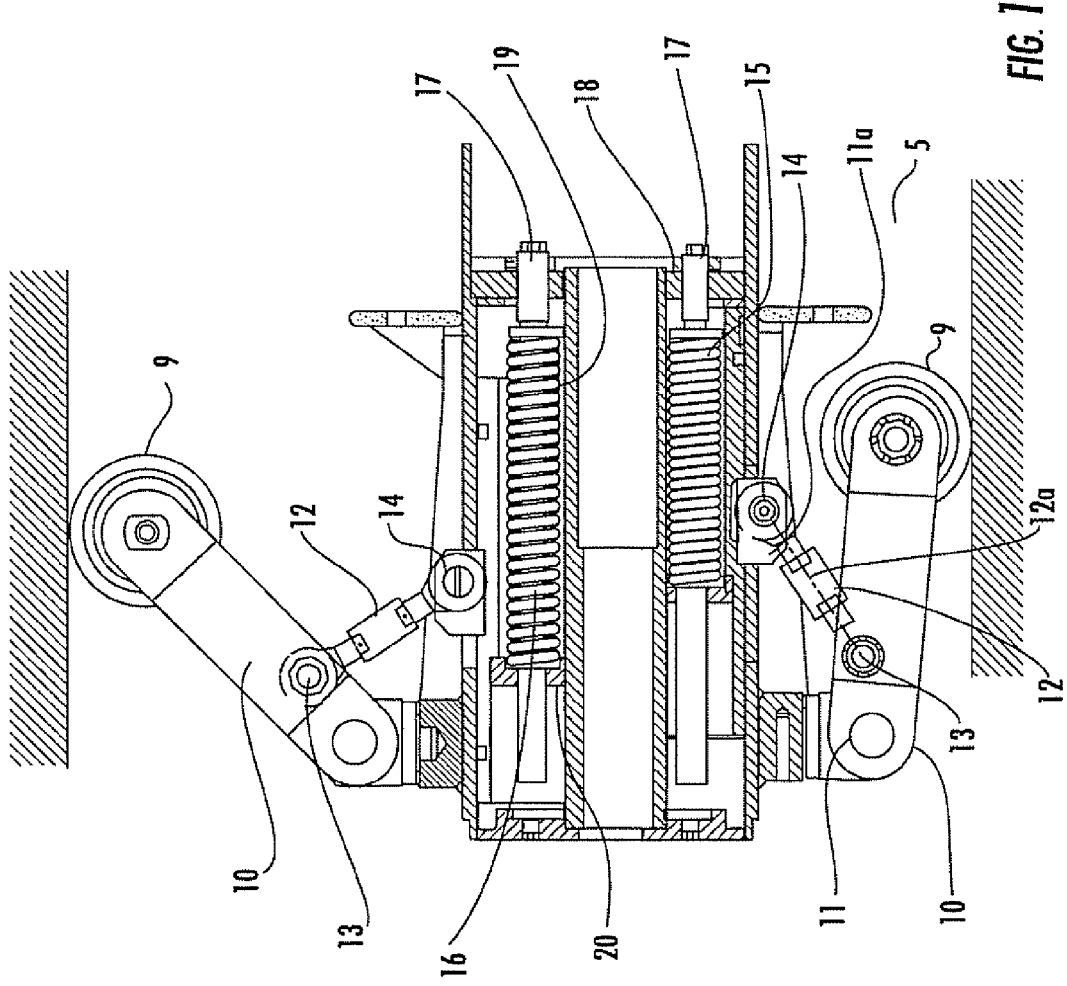
FIG. 1 is a cross section along the vertical axis A-A of the suspension unit shown in FIG. 2.

With reference to FIG. 1, a wheel assembly (5) comprises a wheel (9) rotatably mounted on a suspension arm (10). The suspension arm (10) being pivotally mounted to the body mounting block (11). The suspension arm (10) is also provided with a tie rod (12), which tie rod (12) is provided with a turnbuckle (12a) and is pivotally connected at one end (13) to the suspension arm (10) and at the other end (14) to the piston mounting block (11a). The end (14) of the tie rod (12) is slidably connected to the housing via a piston assembly (15) comprises a spring (16) mounted on a piston shaft (17), the spring (16) resting on a fixed bulk head (18) of the piston chamber (19) and biased against the other slidable bulk head (20) of the chamber (19).

Figure 2:
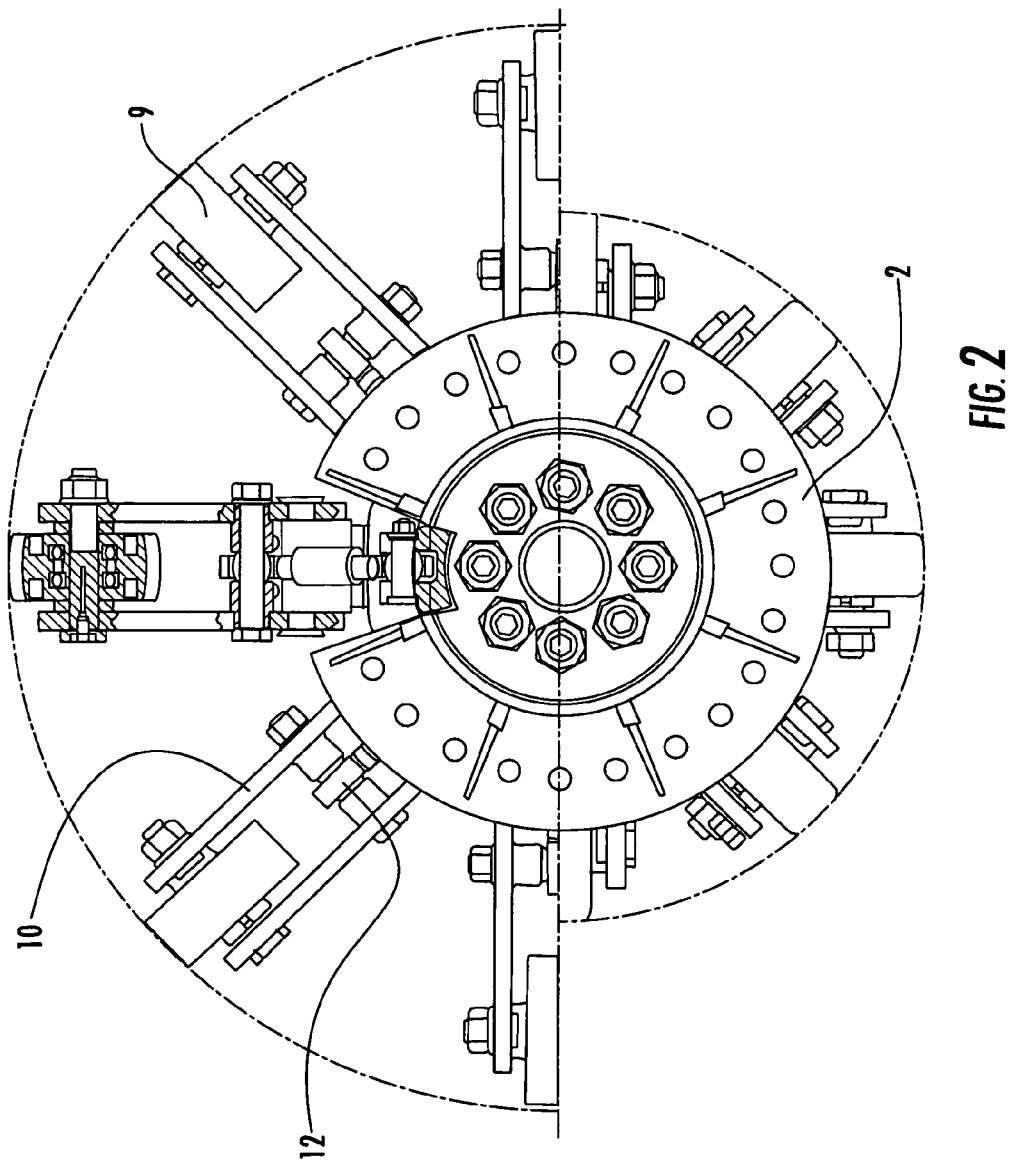
FIG. 2 is an end view of the suspension unit according to the invention.

Referring to FIG. 2, a plurality of radially positioned wheels (9) are each rotatably held by a suspension arm (10), the suspension arm (10) being connected to a piston (17) by a tie rod (12).

Figure 3:
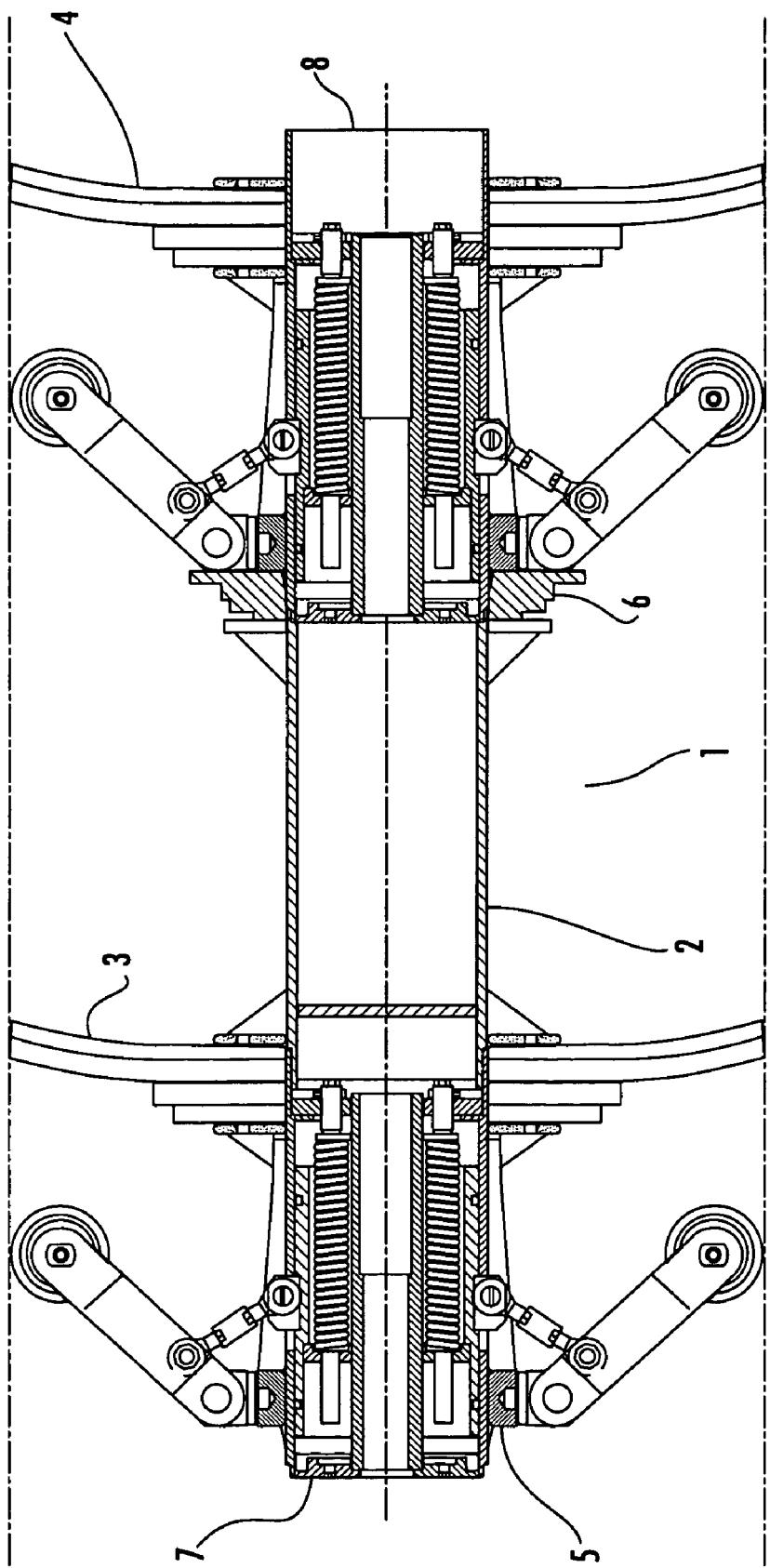
FIG. 3 is a cross-section of a pig provided with two wheel assemblies each comprising a suspension unit of the invention.

With reference to FIG. 3 a pipeline cleaning pig (1) comprises a longitudinal shaft (2), radially mounted cleaning discs (3 and 4) and wheel assemblies (5 and 6) at the forward end (7) and distal end (8) of the shaft (2).

Figure 4:
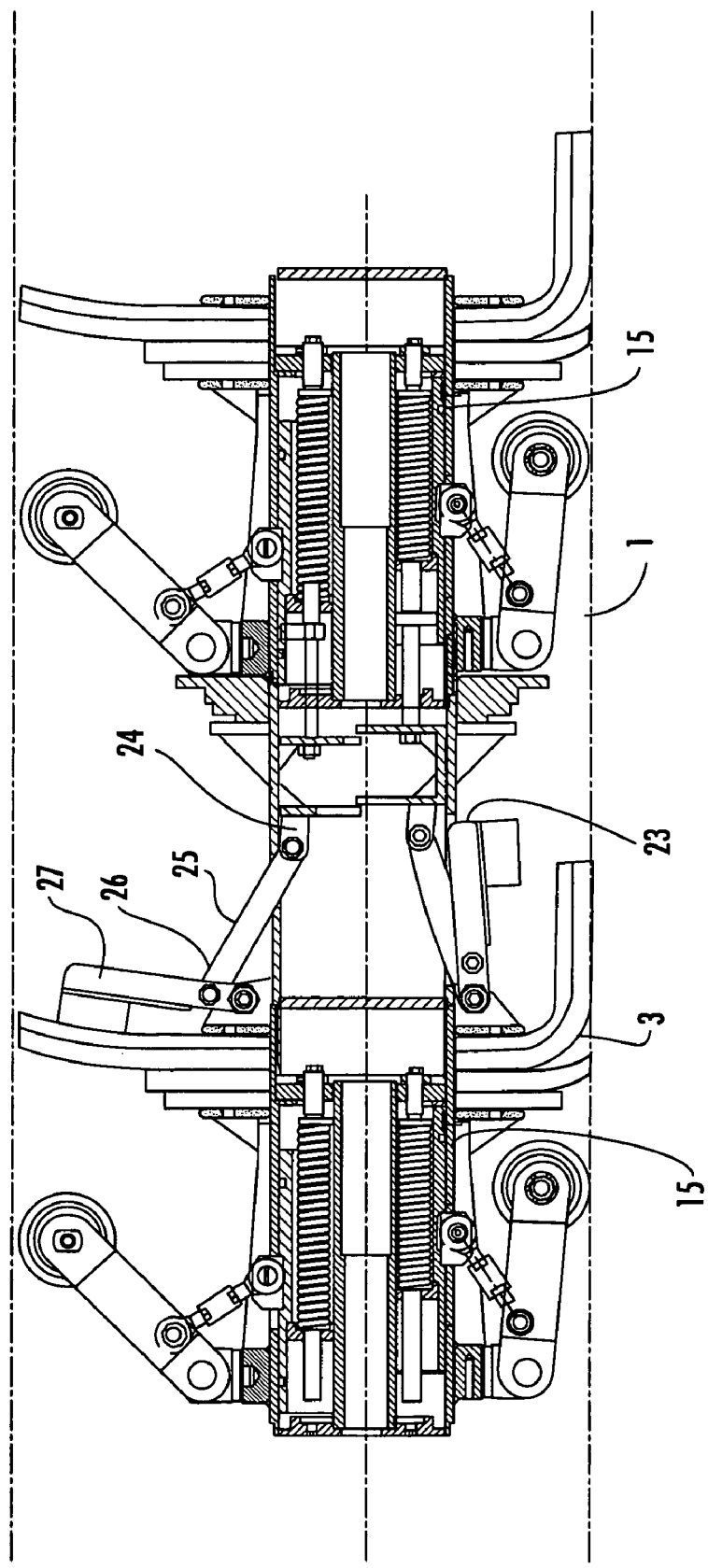
FIG. 4 is a cross section of the suspension unit provided with engaging means between the disc and the piston arrangement.

With reference to FIG. 4, the piston assembly (15) of a pipeline cleaning pig (1) is provided with means (23) enabling the piston (15) to engage with the disc (3). The disc engaging means (23) comprises a push rod (24) attached to the piston (15), the push rod (24) being pivotally connected to an arm, (25). The distal end (26) of the arm (25) is provided with a disc engaging plate (27). The disc engaging plate (27) may optionally be pivotally mounted on the arm (25)

Figure 5:
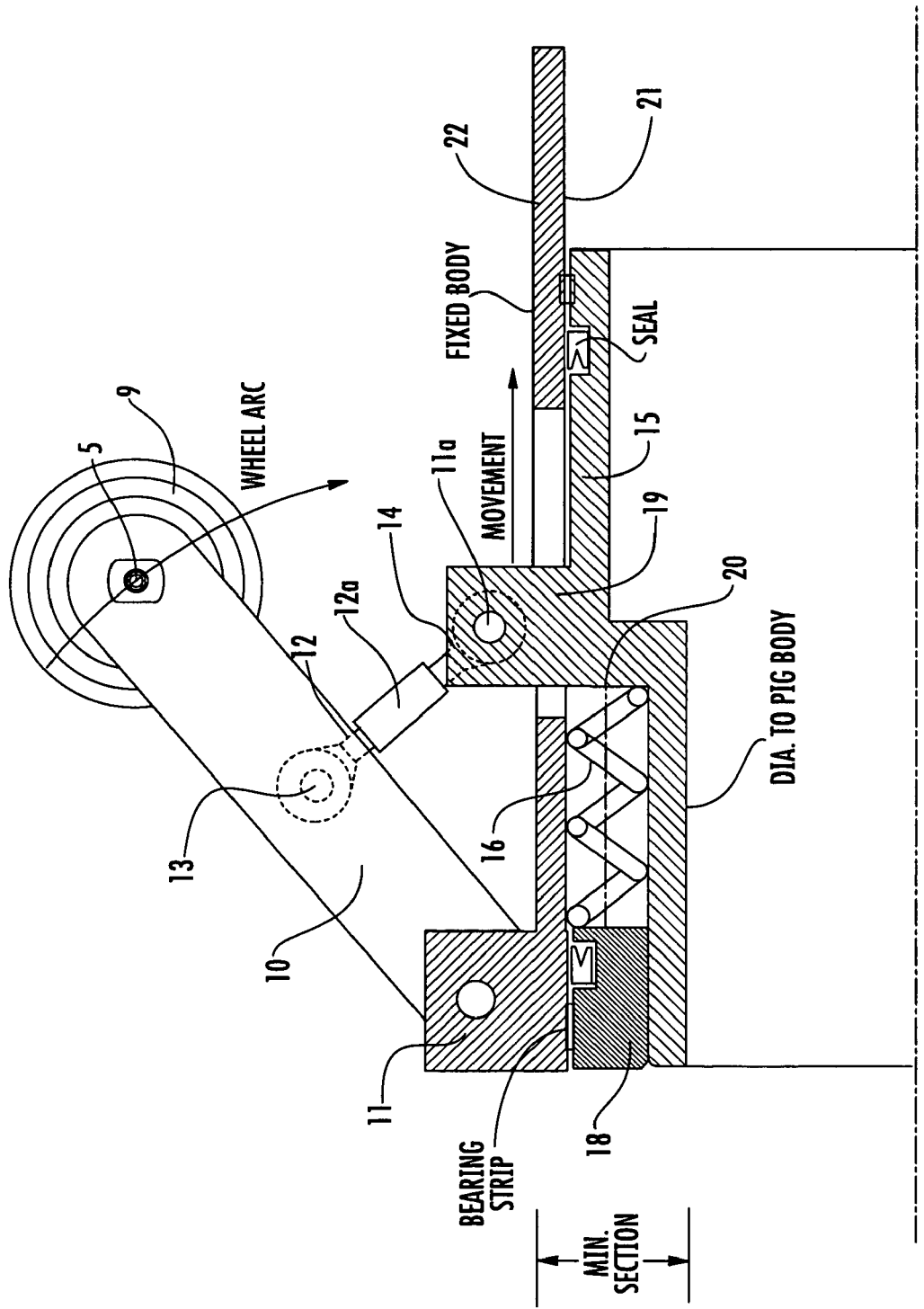
FIG. 5 is a cross section of a hollow suspension unit of a pig.
Figure 6:
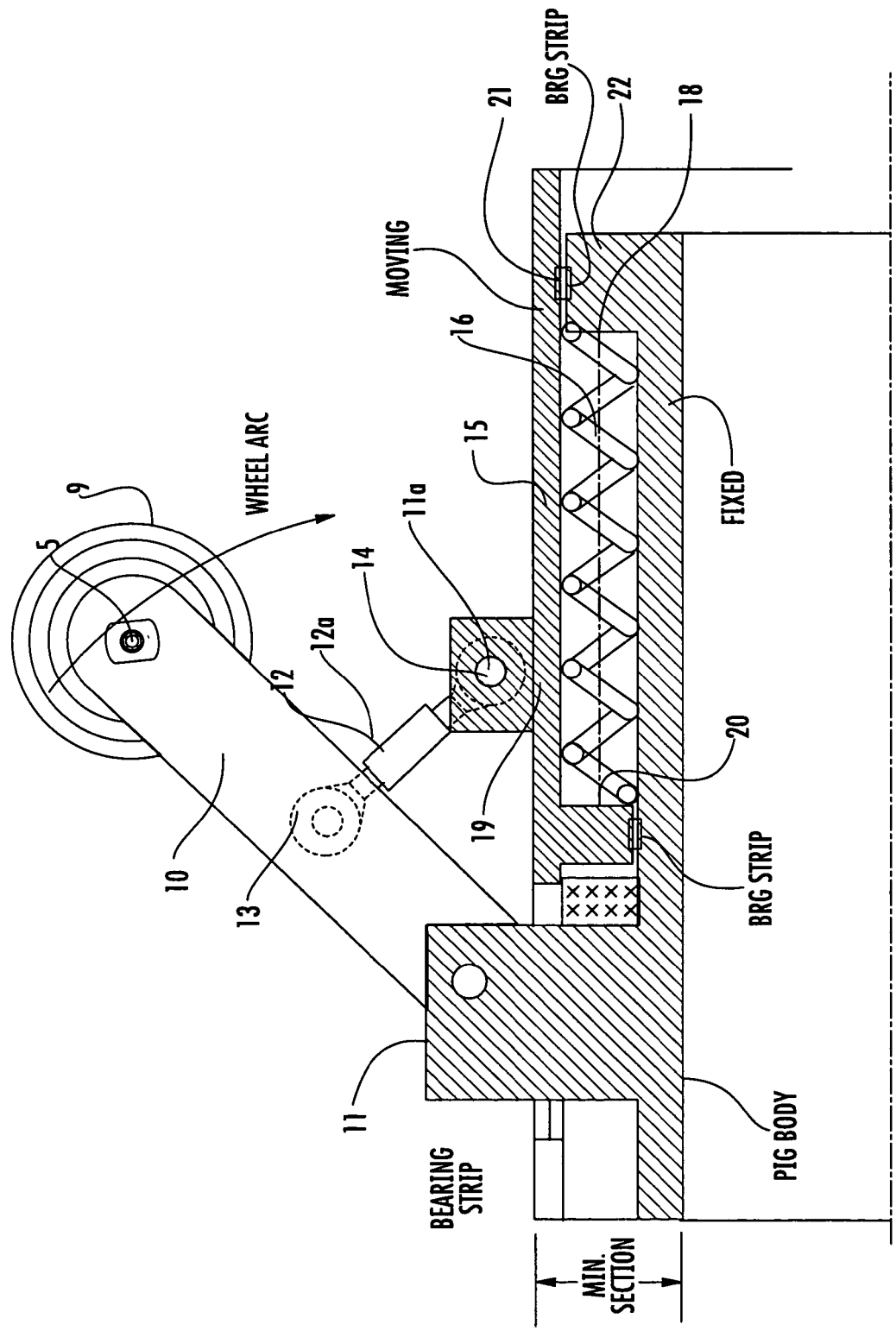
FIG. 6 is a cross section of an alternative wheel and piston arrangement of a hollow suspension unit.
Figure 7:
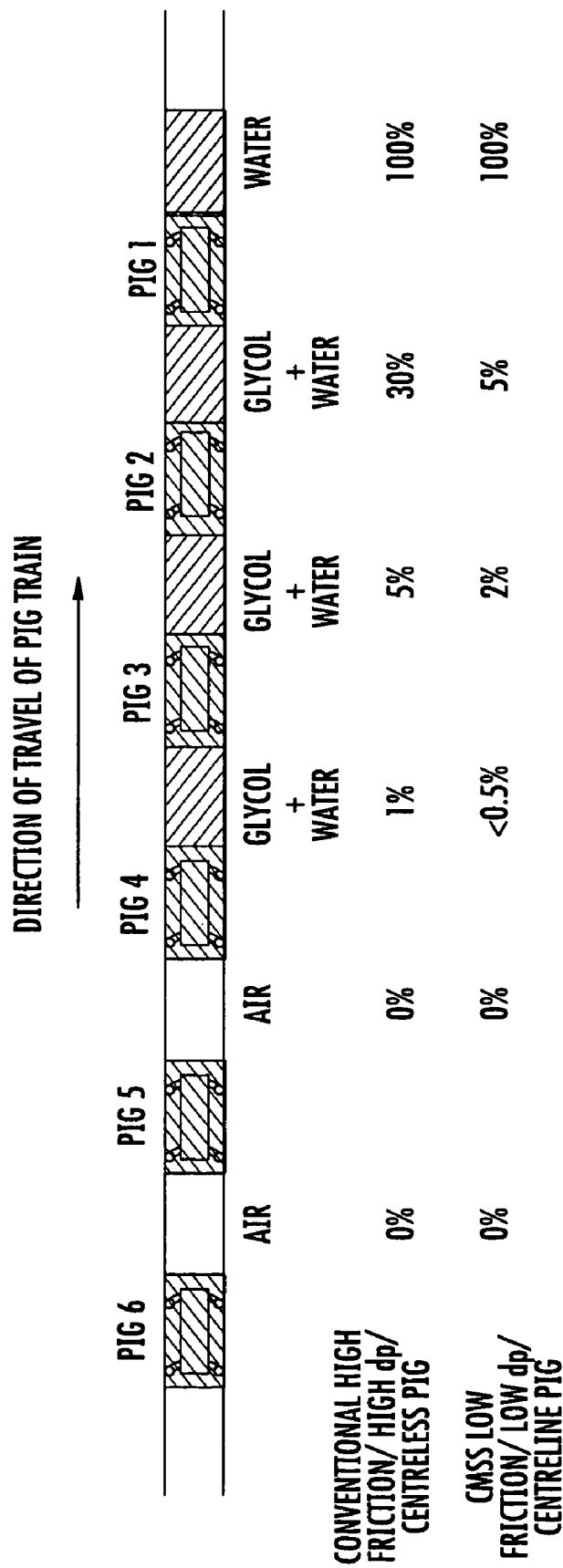
FIG. 7 is a schematic representation of a train of pigs in a pipeline.

With reference to FIGS. 5 and 6, a wheel assembly (5) comprises a wheel (9) rotatably mounted on a suspension arm (10). The suspension ann (10) being pivotally mounted to the body mounting block (11). The suspension arm (10) is also provided with a tie rod (12), which tie rod (12) is provided with a turnbuckle (12a) and is pivotally connected at one end (13) to the suspension arm (10) and at the other end (14) to the piston mounting block (11a). The end (14) of the tie rod (12) and the piston mounting is slidably connected to the housing via a piston assembly (15) comprising a spring (16) mounted in a piston housing, the spring (16) rests on a fixed bulk head (18) of the piston housing and biased against the other slidable bulk head (20) of the piston housing which also forms part of the piston mounting block (1 la). The piston housing (19) is situated on an inner surface of the pig body (22) (FIG. 5) or the outer surface (21) of the pig body (22) (FIG. 6).

In operation the piston biases the tie rod and thus the wheel to fit snugly against the wall of a circular cross section pipe.

With reference to FIG. 6, a series of pigs are passed down a pipeline in a train. Generally, the space between the four leading pigs is providing with a dewatering agent, such as glycol, whilst the space between the three trailing pigs is provided with air. The glycol takes up any water that passes the first sealing disc and so on, so that by the time any water reaches the last glycol plug the water uptake is minimised.

EXAMPLE 1

Suspension Geometry and Force Calculations for a Typical 28 to 42 Inch (71.12 cm to 106.68 cm) System.

Figure 8:
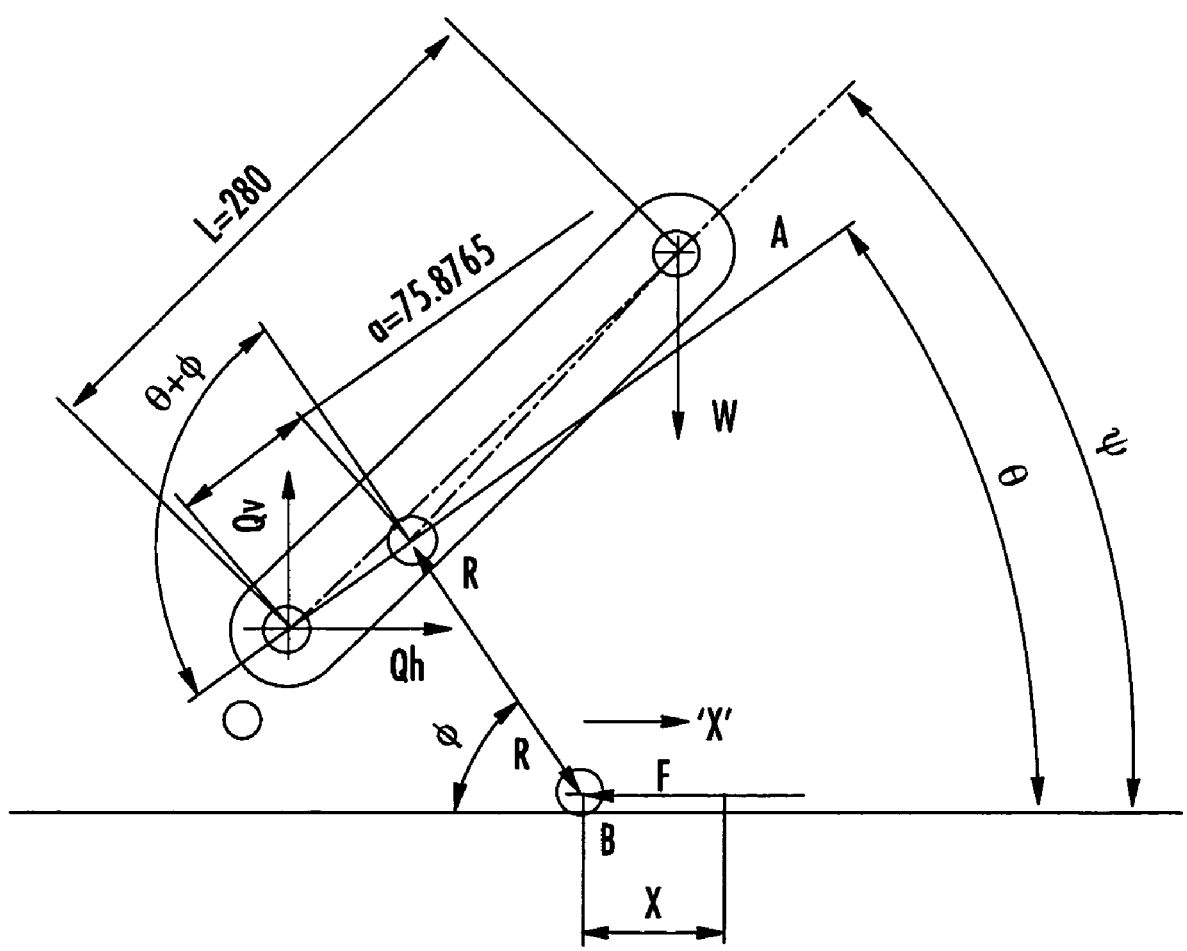
FIG. 8 illustrates centerline suspension geometry for a 28 to 42 inches (71.12 cm to 106.68 cm) suspension.
Figure 9:
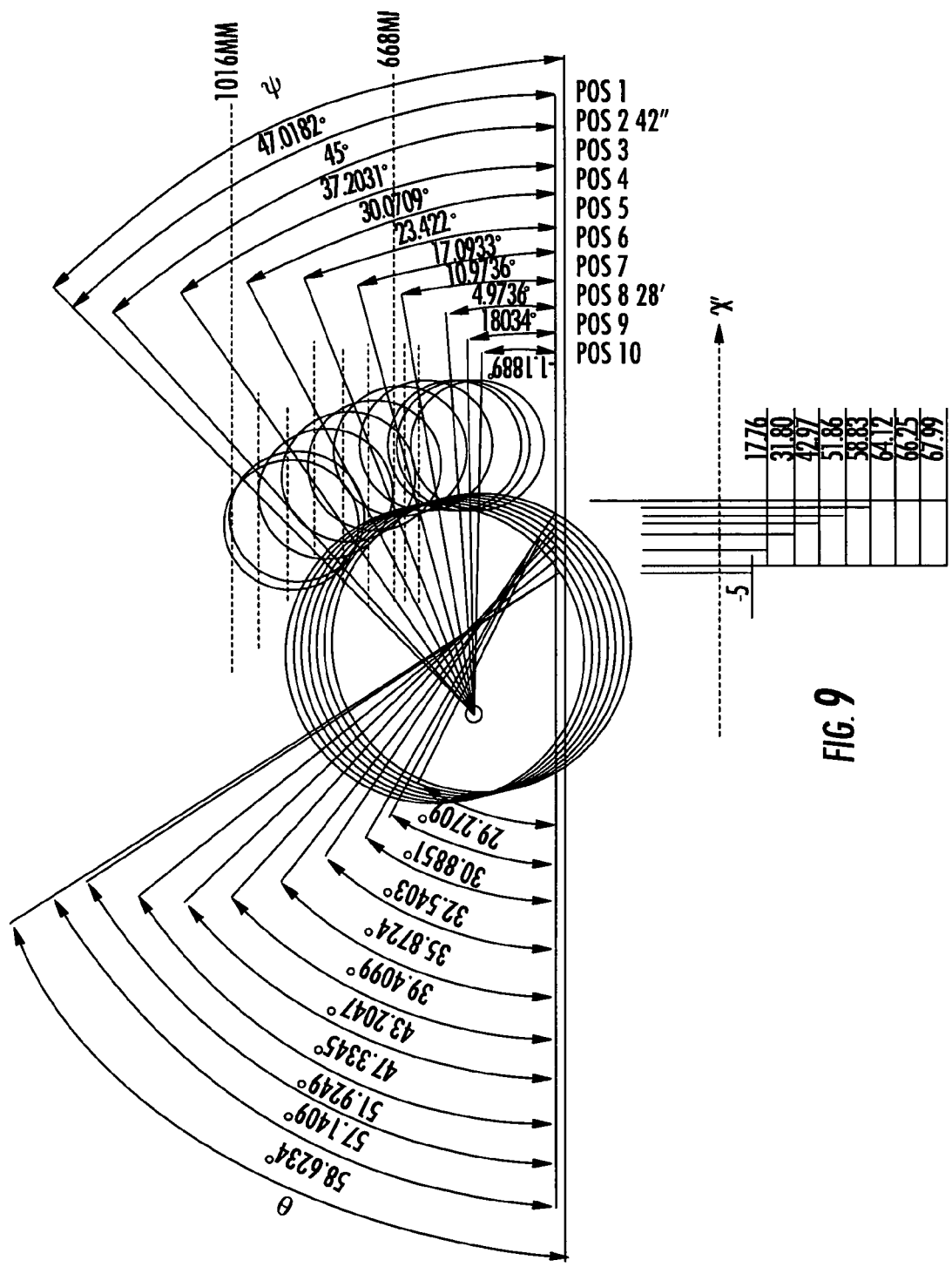
FIG. 9 illustrates the suspension geometry for varying positions including nominal running positions for 42 inch (106.68 cm) and 28 inch (71.12 cm)

FIG. 8 illustrates Centreline Suspension Geometry

W = force at wheel(s)  a = Effective link length 75.8765 mm
R = load in turn-buckle  I = overall arm length
F = Spring (piston force)  $\phi$ = angle between turnbuckle and piston CL
Qh = Hor. force on mounting  $\Phi$ = angle between pivot to body mounting block CL
Qv = Ven. force on mounting  $\Psi$ = Angle between arm CL and piston CL
  $\alpha$ = Difference between $\theta$ and $\psi$; constant = 8.7175°

Note:
Point B is constrained to move horizontally by the inner piston assembly, whilst the arm pivots about point 0.

Take moments about position O for link AO $$W*1*\cos\psi = R*a*\sin(\theta+\phi) \quad \text{a)}$$

but resolving R horizontally at B we get $$R*\cos\phi = F \quad \text{b)}$$

or $$R = F/\cos\phi \quad \text{c)}$$

substitute c) into a)

$$W*1*\cos\psi = F/\cos\phi \, a \, \sin(\theta+\phi)$$

rearranging gives $$W = F*a*\sin(\theta+\phi)/\cos\psi/\cos\phi \quad \text{d)}$$

Simplifying gives $$W = F*k \text{ where } k = \sin(\theta+\phi)/1/\cos\psi/\cos\phi \quad \text{e)}$$

Referring to Table 2 below and calculating k we get NB $\theta = \psi - 8.7175°$

TABLE 1

Suspension geometry and force calculations for a typical 28 inch to 42 inch (71.12 cm to 106.68 cm) system

| Position | y | q | f | k | Dia over Wheels | x (mm) | | | W (N) | | | | |
|---|---|---|---|---|---|---|---|---|---|---|---|---|---|
| | a | 8.7175 | | | | | l | N/mm | 40 | 50 | 60 | 50 | 50 |
| | | | | | | | p | mm | 33.2 | 26.6 | 22.2 | 27.5 | 40.0 |
| 1 | 47.0182 | 38.3007 | 58.5278 | 0.7559 | | −5.00 | # | #### | 6832 | 6529 | 6227 | 6803 | 10583 |
| 2 | 45.0000 | 36.2825 | 57.1409 | 0.7051 | 1016 mm (42") | 0.00 | | | 7500 | 7500 | 7500 | 7756 | 11281 |
| 3 | 37.2031 | 28.4856 | 51.9249 | 0.5440 | | 17.76 | | | 8878 | 9651 | 10424 | 9848 | 12568 |
| 4 | 30.0709 | 21.3534 | 47.3345 | 0.4304 | | 31.80 | | | 8959 | 10054 | 11149 | 10210 | 12362 |
| 5 | 23.4220 | 14.7045 | 43.2047 | 0.3432 | | 42.97 | | | 8371 | 9551 | 10731 | 9675 | 11392 |
| 6 | 17.0933 | 8.3758 | 39.4099 | 0.2718 | | 51.86 | | | 7401 | 8529 | 9656 | 8627 | 9986 |
| 7 | 10.9736 | 2.2561 | 35.8724 | 0.1706 | | 58.83 | | | 5025 | 5828 | 6631 | 5890 | 6743 |
| 8 | 4.9787 | −3.7388 | 32.5403 | 0.1555 | 668 mm (28") | 64.12 | | | 4843 | 5641 | 6438 | 5697 | 6474 |
| 9 | 1.9034 | −6.8141 | 30.8851 | 0.1289 | | 66.25 | | | 4103 | 4786 | 5469 | 4832 | 5477 |
| 10 | −1.1669 | −9.8844 | 29.2709 | 0.1031 | | 67.99 | | | 3341 | 3902 | 4463 | 3939 | 4455 |

| Position | y | q | f | k | Dia over Wheels | x (mm) 0 | 0 | | W (N) | F (N) | R (N) | Qv (N) | Q (N) |
|---|---|---|---|---|---|---|---|---|---|---|---|---|---|
| | a | 8.7175 | | | | | l | N/mm | 50 | 50 | 50 | 50 | 50 |
| | | | | | | | p | mm | 27.5 | 27.5 | 27.5 | 27.5 | 27.5 |
| 1 | 47.0182 | 38.3007 | 58.5278 | 0.7559 | | 0.000 | −5.00 | | 6803 | 9000 | 17239 | 7899 | 11975 |
| 2 | 45.0000 | 36.2825 | 57.1409 | 0.7051 | 1016 mm (42") | 0.00 | | | 7756 | 11000 | 20274 | 9274 | 14388 |
| 3 | 37.2031 | 28.4856 | 51.9249 | 0.5440 | | 0.000 | 17.76 | | 9848 | 18104 | 29357 | 13261 | 22441 |
| 4 | 30.0709 | 21.3534 | 47.3345 | 0.4304 | | 0.000 | 31.80 | | 10210 | 23720 | 35000 | 15526 | 28350 |

TABLE 1-continued

Suspension geometry and force calculations for a typical 28 inch to 42 inch
(71.12 cm to 106.68 cm) system

| 5 | 23.4220 | 14.7045 | 43.2047 | 0.3432 | 0.000 | 42.97 | 9675 | 28188 | 38671 | 16799 | 32814 |
|---|---|---|---|---|---|---|---|---|---|---|---|
| 6 | 17.0933 | 8.3758 | 39.4099 | 0.2718 | 0.000 | 51.86 | 8627 | 31744 | 41086 | 17457 | 36227 |
| 7 | 10.9736 | 2.2561 | 35.8724 | 0.1706 | 0.000 | 58.83 | 5890 | 34532 | 42615 | 19082 | 39453 |
| 8 | 4.9787 | −3.7388 | 32.5403 | 0.1555 | 668 mm (28″) | 64.12 | 5697 | 36648 | 43473 | 17687 | 40693 |
| 9 | 1.9034 | −6.8141 | 30.8851 | 0.1289 | 0.000 | 66.25 | 4832 | 37500 | 43696 | 17598 | 41424 |
| 10 | −1.1669 | −9.8844 | 29.2709 | 0.1031 | 0.000 | 67.99 | 3939 | 38196 | 43787 | 11470 | 42001 |

Similarly, by reference to Table 2 below we can calculate the wheel loads with respect to the suspension geometry that is found to be an extension of a 10 to 16 inch (25.4 cm to 40.64 cm) system.

For each particular range of pipe sizes the calculations remain the same but the values will differ.

Figure 10:
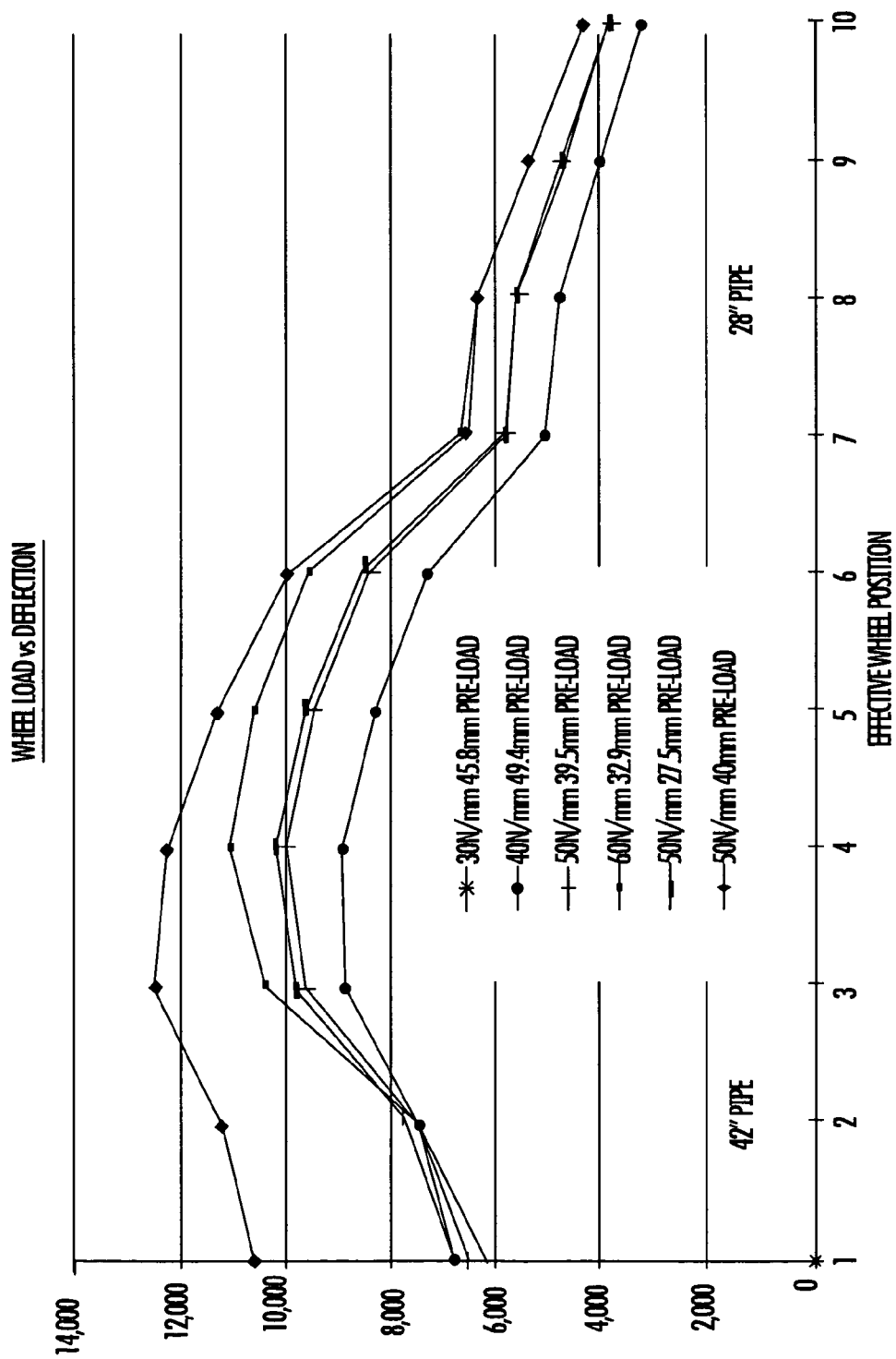
FIG. 10 is a graph of wheel load versus suspension arm deflection, for a 28 inch to 42 inch (71.12 cm) to (106.68 cm) suspension system.

The 28 to 42 inch (71.12 cm to 106.68 cm) and 10 to 16 inch (25.4 cm to 40.64 cm) calculations are given as examples only.

maximum pre-load setting of 40 mm. FIG. 10 shows the data from the Table 1 in graphical form.

EXAMPLE 2

Suspension Modules Material Selection for a Typical 28 to 42 Inch (71.12 cm to 106.68 cm) Suspension System.

The Main Body of the Modules.

TABLE 2 k for varying suspension positions on a typical 10 inch to 16 inch
(25.4 cm to 40.64 cm) system

| Position | y | q | f | k | Dia over Wheels | x (mm) | | | W (N) | | | | |
|---|---|---|---|---|---|---|---|---|---|---|---|---|---|
| | a | 0 | | | | | l | N/mm | 35 | 70 | 60 | 50 | 50 |
| | | | | | | | p | mm | 20.0 | 20.0 | 2.4 | 27.5 | 40.0 |
| 1 | 43.9900 | 43.9900 | 65.3800 | 1.0989 | | 0.00 | | | 769 | 1538 | 1266 | 12088 | 17582 |
| 2 | 38.4400 | 38.4400 | 59.4100 | 0.8677 | (16″) | 8.08 | | | 853 | 1706 | 4365 | 12349 | 16687 |
| 3 | 33.2900 | 33.2900 | 54.3400 | 0.7158 | | 14.62 | | | 867 | 1735 | 5848 | 12060 | 15639 |
| 4 | 28.4300 | 28.4300 | 49.8400 | 0.6027 | | 20.07 | | | 845 | 1691 | 6501 | 11469 | 14482 |
| 5 | 23.7800 | 23.7800 | 45.7200 | 0.5118 | | 24.68 | | | 800 | 1601 | 6653 | 10683 | 13242 |
| 6 | 19.3000 | 19.3000 | 41.8800 | 0.4353 | | 28.60 | | | 740 | 1481 | 6477 | 9768 | 11944 |
| 7 | 14.9300 | 14.9300 | 38.2700 | 0.3685 | | 31.93 | | | 670 | 1340 | 6073 | 8760 | 10603 |
| 8 | 10.6500 | 10.6500 | 34.8200 | 0.3085 | | 34.74 | | | 591 | 1182 | 5499 | 7680 | 9222 |
| 9 | 6.4200 | 6.4200 | 31.5100 | 0.2533 | (10″) | 37.07 | | | 506 | 1012 | 4799 | 6542 | 7809 |
| 10 | 2.2400 | 2.2400 | 28.3200 | 0.2018 | | 38.96 | | | 416 | 833 | 4006 | 5365 | 6374 |

| Position | y | q | f | k | Dia over Wheels | x (mm) | 0 | 0 | W (N) | F (N) | R (N) | Qv (N) | Q (N) |
|---|---|---|---|---|---|---|---|---|---|---|---|---|---|
| | a | 0 | | | | | l | N/mm | 70 | 70 | 70 | 70 | 70 |
| | | | | | | | p | mm | 20.0 | 20.0 | 20.0 | 20.0 | 20.0 |
| 1 | 43.9900 | 43.9900 | 65.3800 | 1.0989 | | 0.00 | | | 1538 | 1400 | 3361 | 1517 | 2064 |
| 2 | 38.4400 | 38.4400 | 59.4100 | 0.8677 | (16″) | 8.08 | | | 1706 | 1966 | 3863 | 1619 | 2547 |
| 3 | 33.2900 | 33.2900 | 54.3400 | 0.7158 | | 14.62 | | | 1735 | 2423 | 4157 | 3355 | 2928 |
| 4 | 28.4300 | 28.4300 | 49.8400 | 0.6027 | | 20.07 | | | 1691 | 2805 | 4349 | 1633 | 3246 |
| 5 | 23.7800 | 23.7800 | 45.7200 | 0.5118 | | 24.68 | | | 1601 | 3128 | 4480 | 1606 | 3516 |
| 6 | 19.3000 | 19.3000 | 41.8800 | 0.4353 | | 28.60 | | | 1481 | 3402 | 4569 | 1569 | 3747 |
| 7 | 14.9300 | 14.9300 | 38.2700 | 0.3685 | | 31.93 | | | 1340 | 3635 | 4630 | 1528 | 3943 |
| 8 | 10.6500 | 10.6500 | 34.8200 | 0.3085 | | 34.74 | | | 1182 | 3832 | 4668 | 1483 | 4109 |
| 9 | 6.4200 | 6.4200 | 31.5100 | 0.2533 | (10″) | 37.07 | | | 1012 | 3995 | 4686 | 1437 | 4246 |
| 10 | 2.2400 | 2.2400 | 28.3200 | 0.2018 | | 38.96 | | | 833 | 4127 | 4688 | 1391 | 4355 |

Of the above options only the 50 N/mm spring is suitable to fit within the space constraints of the pig body. With this rate the weight 7,500N of a section will be adequately supported at 42 inches (106.68 cm) but only 72% supported at 28 inches (71.12 cm). However the actual weight of the vehicle is now known to be a total of 1,000-kg or 5,000N per module so the configuration is adequate even at 28 inches (71.12 cm). Rather than operate with maximum spring pre-load, 27.5 mm was chosen as giving a better match to support the actual vehicle weight. The final column shows the effect on wheel loading if the springs are adjusted to their The material selected for the main body of the suspension modules is a drawn over mandrel (DOB) cylinder tube ref. ASTM A513 grade 1026. The drawn tube has a tensile strength figure of 585 N/mm². The other components fabricated onto the body are BS970:080M50 (EN43A).

The finished body is phosphated all over and the external surfaces are xylan 1070 coated.

The Piston.

The material selected for the piston is BS970:080M50. The piston comprises a main tube and a welded in flange of the same material. The finished piston is phosphated and xylan 1070 coated.

The Suspension Linkage Mechanism.

The majority of the suspension linkage components are manufactured from BS970:708M40 which is heat treated to condition R. This gives a tensile strength 700/850 N/mm$^2$ and a hardness value of 201/255 HB. The components that are not manufactured from this material are the suspension arms due to the requirement to be able to have simple fabrication done, are manufactured from BS970:080M40 (EN8). All suspension linkage components are phosphated and xylan 1070 coated.

Suspension Springs.

The spring rate and overall working parameters were passed on to our chosen spring manufacturer.

Discussion indicated that the springs should be manufactured from BS1429:735A50 which is hardened and tempered to 48/50 HRC.

Following heat treatment the springs are shot peened and zinc plated and passivated.

Wheel Assembly.

The wheel assembly components are manufactured form stainless steel AISI No 303 (hub) and 316 (rest).

Stainless 303 was chosen for being non-magnetic when used in an inspection vehicle environment whereas 316 was chosen for its extra resistance to sea water.

The tyre material is a polyurethane which has a hardness rating of 92-95 Shore A.

The bearing elements are sealed units and a rotating labyrinth seal in stainless steel ref 1.4310 is positioned in two places.

The invention claimed is:

1. A pipeline pig provided with a suspension system for a pig shaft, said suspension system comprising a plurality of wheels, each wheel being supported by a respective radially mounted suspension arm connected, via a pivot pin, to a suspension mounting, the suspension arm also being connected, at a point along its length, to a tie rod, the tie rod being connected to a sliding piston assembly comprising a piston operable in a direction parallel with an axis of the pig shaft, such that the suspension system provides substantially constant wheel loading to accommodate a multi-diameter pipeline, and a pivot axis of the pivot pin of the suspension arms is offset at an angle from the plane of the cross section of the pig shaft so flat the pig rotates as it travels down a pipe.

2. A pipeline pig according to claim 1 wherein the pivot pin of the suspension arms is offset between 1° and 3° from the pig shaft axis.

3. A pipeline pig according to claim 2 wherein the pivot pin of the suspension arms is offset by 2° from the pig shaft axis.

4. A pipeline pig according to claim 1 wherein the piston assembly includes a spring loaded piston.

5. A pipeline pig according to claim 1 wherein the piston assembly is internally mounted in the pig shaft.

6. A pipeline pig according to claim 1 wherein the pig is an inspection pig.

7. A pipeline pig according to claim 1 wherein the piston assembly is also provided with a disc engaging means.

8. A pipeline pig according to claim 1 provided with at least one sealing disc and at least one guide disc and having a high dewatering efficiency.

9. A pipeline pig according to claim 8 wherein the pig has a differential pressure of 0.5 bar or less.

10. A pipeline pig according to claim 1 provided with at least two wheel assemblies on which the plurality of wheels are mounted.

11. A pipeline pig according to claim 10 wherein the wheels of one of the two wheel assemblies are rotationally offset from the plane in which the wheels of a second of the wheel assemblies operate.

12. A pipeline pig according to claim 1 adapted to be a monitoring pig.

13. A pipeline pig according to claim 12 wherein the pig is coupled to at least one other pig.

14. A pipeline pig according to claim 1 provided with at least one sealing disc and at least one guide disc, and having a flip pressure of 5 bar or less.

15. A pipeline pig according to claim 14 wherein the sealing disc is of a collapsible nature enabling the pig to be used in multidimensional pipes.

16. A method of cleaning a pipeline which comprises passing a pipeline pig according to claim 1 down the pipeline.

17. A method of detecting a defect in a pipeline which comprises passing a pipeline pig according to claim 12 down the pipeline.

* * * * *

UNITED STATES PATENT AND TRADEMARK OFFICE
CERTIFICATE OF CORRECTION

PATENT NO. : 7,328,475 B2  Page 1 of 1
APPLICATION NO. : 11/438571
DATED : February 12, 2008
INVENTOR(S) : Smith et al.

It is certified that error appears in the above-identified patent and that said Letters Patent is hereby corrected as shown below:

Column 11, Claim 1, Line 44: Please correct "so flat the"
To read -- so that the --

Signed and Sealed this

Tenth Day of June, 2008

JON W. DUDAS
*Director of the United States Patent and Trademark Office*

UNITED STATES PATENT AND TRADEMARK OFFICE
CERTIFICATE OF CORRECTION

PATENT NO. : 7,328,475 B2  Page 1 of 1
APPLICATION NO. : 11/438571
DATED : February 12, 2008
INVENTOR(S) : Smith et al.

It is certified that error appears in the above-identified patent and that said Letters Patent is hereby corrected as shown below:

On Title Page Item 73, Assignee: Please correct "FLT" to read -- FTL --

Signed and Sealed this

First Day of September, 2009

David J. Kappos
*Director of the United States Patent and Trademark Office*